United States Patent
Sinha et al.

(10) Patent No.: US 7,945,941 B2
(45) Date of Patent: May 17, 2011

(54) FLEXIBLE ACCESS CONTROL POLICY ENFORCEMENT

(75) Inventors: Santanu Sinha, Cupertino, CA (US); David J. Pignatelli, Saratoga, CA (US); Alan Carr, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 11/757,215

(22) Filed: Jun. 1, 2007

(65) Prior Publication Data

US 2008/0301755 A1    Dec. 4, 2008

(51) Int. Cl.
G06F 21/20 (2006.01)
G06F 15/16 (2006.01)
H04L 29/06 (2006.01)

(52) U.S. Cl. .............. 726/1; 726/14; 709/228

(58) Field of Classification Search .......... None
See application file for complete search history.

(56) References Cited

U.S. PATENT DOCUMENTS

| | | | |
|---|---|---|---|
| 6,662,235 B1 * | 12/2003 | Callis et al. | 719/318 |
| 6,857,018 B2 * | 2/2005 | Jiang | 709/225 |
| 6,941,465 B1 * | 9/2005 | Palekar et al. | 726/1 |
| 6,950,818 B2 * | 9/2005 | Dennis et al. | 1/1 |
| 7,003,578 B2 * | 2/2006 | Kanada et al. | 709/230 |
| 7,047,288 B2 * | 5/2006 | Cooper et al. | 709/223 |
| 7,174,563 B1 * | 2/2007 | Brownlie et al. | 726/1 |
| 7,260,830 B2 * | 8/2007 | Sugimoto | 726/1 |
| 7,304,982 B2 * | 12/2007 | Hondo et al. | 370/351 |
| 7,337,224 B1 * | 2/2008 | Van Horne et al. | 709/225 |
| 7,516,475 B1 * | 4/2009 | Chen et al. | 726/1 |
| 7,636,937 B1 * | 12/2009 | Bhattacharya et al. | 726/2 |
| 2005/0114602 A1 | 5/2005 | Ngai et al. | |
| 2009/0031395 A1 * | 1/2009 | Lee | 726/1 |

* cited by examiner

*Primary Examiner* — Christopher A Revak
(74) *Attorney, Agent, or Firm* — Baker Botts L.L.P.

(57) ABSTRACT

A method and system for applying access-control policies. In particular implementations, a method includes determining one or more policies, and a prioritization order for the determined policies, based on the one or more parameters; accessing an indirection table to create an entry for the client, wherein the entry indicates the prioritization order of the determined policies; and creating one or more entries in one or more policy data structures for the one or more determined policies.

20 Claims, 6 Drawing Sheets

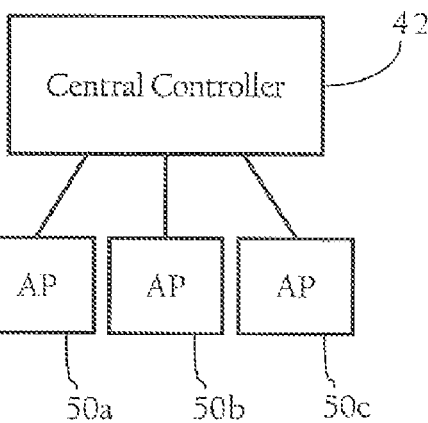
Fig._1B
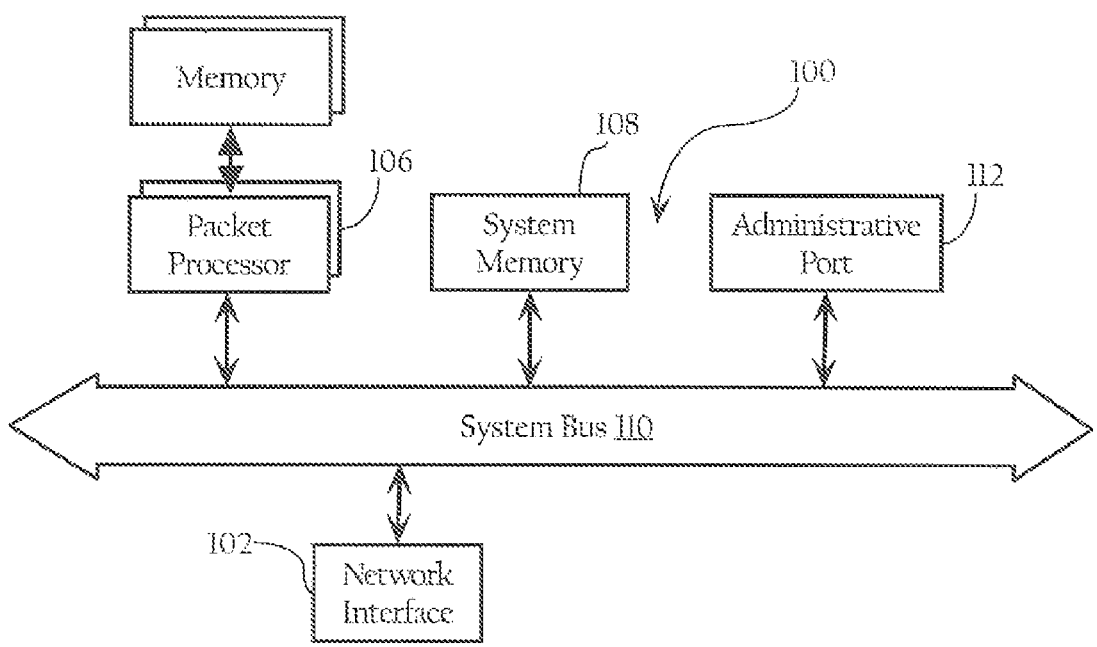
Fig._1C

Policy List 1

| Key | Policy |
|---|---|
| MAC1 | Accept / QoS = Low |
| MAC2 | Deny |
| MAC3 | Accept / QoS = high |
| MAC4 | Accept / QoS = Normal |
| MAC5 | Deny |
|  |  |

Policy List 2

| Key | Policy |
|---|---|
| VLAN 1 / RTP | Accept |
| VLAN 2 / FTP | Deny |
|  |  |
|  |  |
|  |  |
|  |  |

Policy List 3

| Key | Policy |
|---|---|
| Network 2; RTP | Allow |
| Network 5; FTP | Deny |
| Network 7; RTP | Deny |
|  |  |
|  |  |
|  |  |

Indirection Table

| Key | Policy(ies) |
|---|---|
| MAC1 | 3, 2, 1 |
| MAC2 | 2, 1 |
| MAC3 | 1, 2, 3 |
| MAC4 | 2, 3 |
| MAC5 | 1, 2, 3 |
|  |  |

Fig._3

FLEXIBLE ACCESS CONTROL POLICY ENFORCEMENT

TECHNICAL FIELD

This disclosure relates generally to policy enforcement in computer networks.

BACKGROUND

The network communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs typically require matching packets on a subset of fields of the packet header or flow label with the semantics of a sequential search through the ACL rules.

Access control and quality of service features are typically implemented based on programming contained in one or more ACLs. A network administrator controls access to a network using access control lists (ACLs). ACLs are very flexible and allow the network administrator to specify several conditions to be met and several actions to be taken. The syntax is such that it is most easily interpreted in a serial fashion. When an ACL entry matches a packet in a process of serially evaluating an ACL in a known system, one of the actions that may be required is to skip over a certain number of subsequent ACL entries before resuming the serial evaluation. When implemented by a software program, a serial interpretation is quite natural, however, the number of packets per second that can be processed is limited.

In high performance network switches, a ternary content addressable memory (TCAM) is commonly used to increase the number of packets per second that can be processed as it allows lookup operations to be performed in parallel on numerous entries corresponding to ACL actions. However, the performance advantage of a TCAM is only available if all entries are evaluated at once and a TCAM chip can only provide the address of the first matching entry.

So, to implement features in hardware in which more than one matching condition can be specified, these multiple ACL lists are typically combined into one list using a software merge transformation which can be used for programming and associative memory. Various techniques are known for combining these items, such as Binary Decision Diagram (BDD) and Order Dependent Merge (ODM). For example, if there are two ACLs A (having entries A1 and A2) and B (having entries B1 and B2), then ODM combines these original lists to produce one of two cross-product equivalent ordered lists, each with four entries: A1B1, A1B2, A2B1, and A2B2; or A1B1, A2B1, A1B2, and A2B2.

These four entries can then be programmed into an associative memory and an indication of a corresponding action to be taken placed in an adjunct memory. Lookup operations can then be performed on the associative and adjunct memories to identify a corresponding action to use for a particular packet being processed. There are also variants of ODM and BDD which may filter out the entries which are unnecessary as their values will never allow them to be matched.

However, these software merge techniques can cause each ACL entry to consume multiple entries in the TCAM. To reduce the size of the TCAM, there also exist mechanisms that use multiple ACLs corresponding to multiple groups, and means for merging indications of matching items of multiple groups and possibly associated with skip conditions to identify winning entries of particular use for implementing access control lists. In one embodiment, indications are received from an associative memory bank indicating which locations were matched during a lookup operation. Each of the entries is typically associated with one or more hierarchical groups and a skip or no-skip condition. The matching entries are merged to identify one or more winning entries, these being matching entries not in a group that is skipped. A group is typically skipped if the highest priority matching entry of the particular group is associated with a skip condition. A priority encoder can be used to identify a single highest priority winning entry from the winning entries. So, to implement features in hardware in which more than one matching condition.

While the above described mechanism operates for its intended purpose, the policies and prioritizations among them are generally static. Such polices are typically static and are applied based upon fixed information extracted from recognized network protocol headers in each packet. Roaming capabilities of wireless clients present a challenge to implementation of policy. In wireless networking, some policies are characteristic of the original or home network to which a client is associated or to a client group to which the client belongs. These static, packet-based policy mechanisms, however, do not provide for the application of policies based on information outside of discoverable attributes of the packets themselves, such as connection information associated with a client who has roamed to another network.

DESCRIPTION OF THE DRAWINGS

FIG. 1B illustrates an example hierarchical wireless network including a central controller.

FIG. 1C illustrates an example hardware system, which may be used to implement a central controller.

FIGS. 2A, 2B, and 2C illustrate example policy lists according to one implementation.

FIG. 3 illustrates an example indirection table according to one implementation.

DESCRIPTION OF EXAMPLE EMBODIMENTS

A. Overview

Figure 1A:
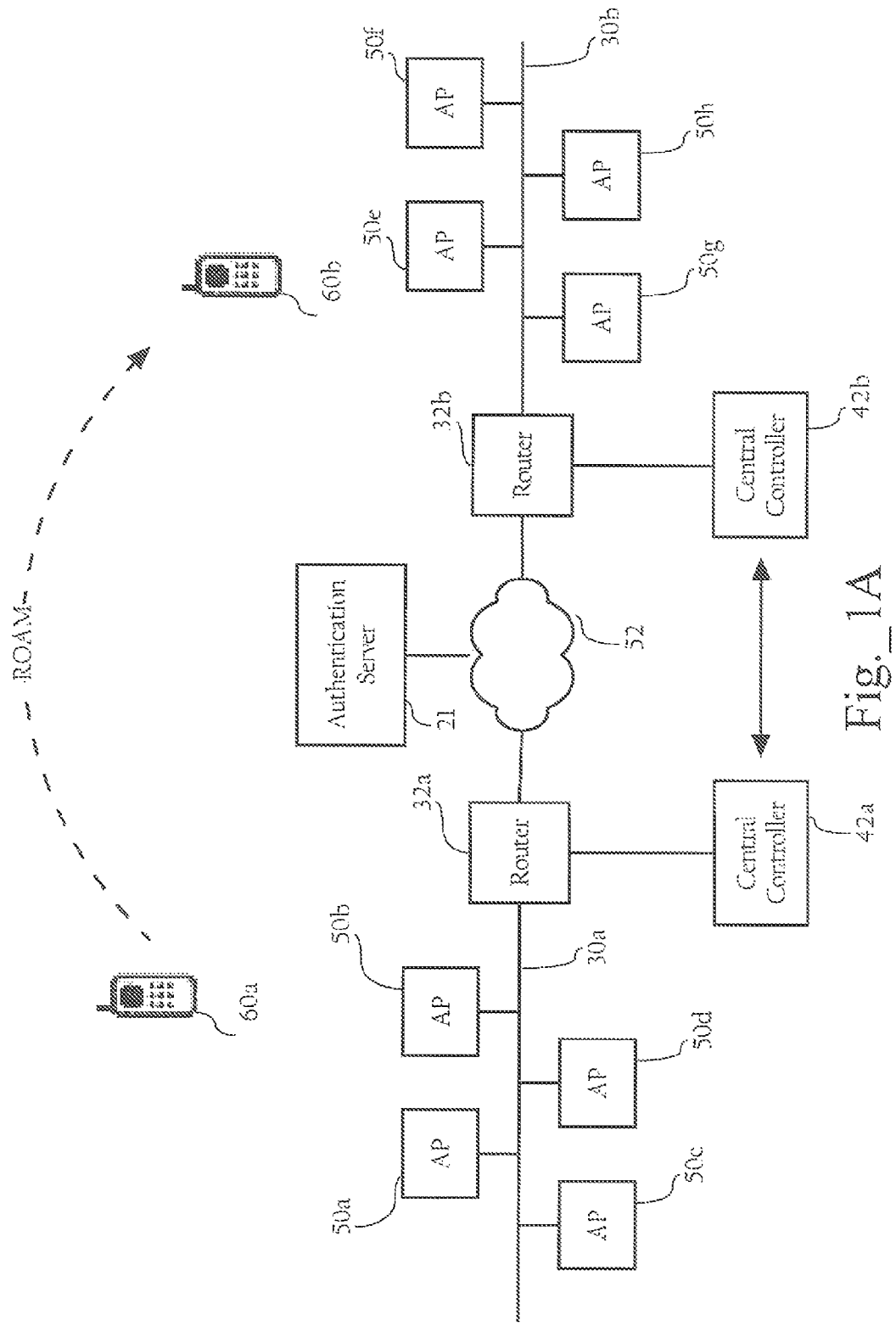
FIG. 1A illustrates example components in a wireless local area network (WLAN) system.

Particular implementations facilitate dynamic application of access-control policies based on specific client information. According to particular implementations, the present invention allows a central controller or other network node to apply a set of policies with a prioritization specific to each client. More specifically, in one implementation, when a client initially associates with a given WLAN, a variety of attributes corresponding to the client connection can determine the set of policies that are applicable, such as general or network policies, virtual Local Area Network (VLAN) or group policies and client specific policies. Furthermore, as a client roams through a wireless network infrastructure, one or more of the policies from this policy set may have to follow the client as it roams. Still further, when a client roams to a foreign network, additional policies associated with that foreign network may be applicable. These policies may or may not conflict with the original policy set of the wireless client. Particular implementations of the invention provide for a dynamic mechanism that allows for the selection and prioritization of these policies.

As described in more detail below, the central controller maintains an indirection table and one or more policy lists. Each policy list may be specific to a key type, and each key type corresponds to a different tuple of attribute types (such as client Media Access Control (MAC) address, VLAN, protocol identifiers, etc.). In particular implementations, an attribute tuple includes a combination of various client and frame attribute information. In one implementation, the client and frame attribute information may include, for example, a client identification (ID), a VLAN or group ID, a network ID, protocol identifiers, etc. For example, one policy list may contain network-based policies. Another policy list may contain VLAN or group-based policies. Another policy list may contain client-based policies. In one implementation, the central controller utilizes an indirection table, which maps the client information to one or more policy lists, in order to select and prioritize one or more of the policy lists. For example, depending on the client information, the indirection table indicates, for each client, the prioritization of the policies to be applied for that client.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

B. Example Wireless Network System Architecture

B.1. Network Topology

FIG. 1A illustrates example components in a wireless local area network (WLAN) system. In a specific embodiment of the present invention, the system includes an Authentication Authorization and Account (AAA) server 21, central controllers 42a and 42b, local area networks (LANs) 30a and 30b, routers 32a and 32b, and wireless access points 50a, 50b, 50c, 50d, 50e, 50f, 50g, and 50h. Each of the LANs 30a and 30b may be implemented by a switch (or an array of switches) and/or other network devices, such as a bridge. In particular implementations, a WLAN to which a given client originally connects may be referred to as a home network, and a WLAN to which a given client roams may be referred to as a foreign network. For example, a client associating with a WLAN at the physical entrance to a building. The WLAN may be a home network. A foreign network may be a WLAN in another physical sector of the building. Typically, when a client roams, connection state and other context information for that client is passed from a node (such as a central controller) in the home network to a node in the foreign network, such as another central controller.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between central controller 42 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible.

The wireless access points 50 are operative to wirelessly communicate with remote wireless client devices 60a and 60b. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 42 may be operably connected to one or more access points over a switched and/or routed network environment, as FIG. 1A illustrates.

FIG. 1C illustrates an example hardware system 100, which may be used to implement one of central controllers 42a or 42b. As FIG. 1C shows, in one implementation, the central controller 42 includes a network interface 102, one or more packet processors 106, a system memory 108 that stores one or more software modules such as a policy application including instructions for performing the functions described herein, and a system bus 110 operably connecting these components. In one implementation, each of the packet processors 106 may be application-specific integrated circuit (ASIC)-based with the necessary logic and embedded central processing units (CPUs) for performing some of the functions described herein. The central control elements may optionally include an administrative port 112 allowing for administrative access for such purposes as configuration and diagnostic access.

C. Policy Lists and Indirection Table

In the implementation described below, a control plane process creates indirection table and policy list entries in response to the initiation of a connection between a network and a new client. A data plane process, typically executed by packet processor 106, accesses the indirection table and the policy lists to apply one or more policies to frames sourced from, or destined for, the clients.

C.1. Policy Types

In particular implementations, different central controllers may enforce different policies. In particular implementations, a given central controller may enforce network-based policies, VLAN or group-based policies, and client-based policies. In one implementation, network-base policies may vary depending on the type of medium. For example, one network-based policy set may include wired network policies. Another network-based policy set may include wireless network/WLAN-based policies (e.g., bandwidth policies, access policies, etc.). In one implementation, wireless network/WLAN-based policies, as well as attachment/location based policies, may be generic or default policies applied to all clients by default. In one implementation, network-based polices may be directed to the type of traffic that can be transmitted across the network. For example, a given policy may determine whether to allow File Transfer Protocol (FTP) traffic or Real-Time Transport Protocol (RTP). In one implementation, network-based policies may vary depending on particular network infrastructure nodes. For example, policies may vary by controller, wireless access point, location, etc. In particular implementations, WLAN specific wireless transport policies having mainly to do with access to the wireless medium generally do not transfer from one WLAN to another. In other words, a given network-based policy may not follow the client from one network to another. In particular implementations, such policies may include Quality of Service (QoS) policies, security policies, etc.

In one implementation, VLAN identifier may be used to create groups of clients assigned to a particular VLAN, where each user group may map to a policy set. For example, VLAN or group-based policies may determine whether a client belonging to a particular group (e.g., guest clients) may transmit a particular type of traffic or access a particular network or network segment. In some particular implementations, VLAN or group-based policies may determine whether the access point is allowed to bridge traffic between two wireless clients. Some VLAN or group-based policies may be shared by multiple groups of clients while other VLAN or group-based policies may be different for different groups.

In one implementation, client-based policies are specific to a given client. For example, a client-based policy may assign a particular client a particular QoS level (e.g., low priority, normal priority, high priority, etc.). In one implementation, the authentication server 21 may be a source of client-specific policies that override other more general policies. For example, an authentication server override may deny access for an identified rogue client, or specifically permit traffic associated with a specific client. In other words, these policies may be enforced by the home network to which the client originally associated/authenticated, and may be enforced by a foreign network to which the client roams.

When a client roams, a first central controller may pass policy and connection state information to a second central controller. Furthermore, traffic of the client is tunneled from the foreign network controller to the home network controller, which can itself apply one or more policies. While some policies such as network-based policies may not follow the client from one network to another, other policies such as VLAN or group-based policies and client-based policies may follow a client from one network to another As indicated above, in particular implementations, when a client initially associates with a given WLAN, a variety of attributes corresponding to the client connection can determine the set of policies that are applicable, such as general or network policies, VLAN or group policies and client specific policies. Furthermore, as a client roams through a wireless network infrastructure, one or more of the policies from this policy set may, in essence, have to follow the client. For example, assume that a wireless client associates with a home network that allows RTP traffic. If the client roams, during a VoIP session, to another network that does not ordinarily allow RTP traffic, the central controller corresponding to that network should ideally allow RTP traffic of the VoIP session. Still further, when a client roams to a foreign network, additional policies associated with that foreign network may be applicable. These policies may or may not conflict with the original policy set of the wireless client. Particular implementations of the invention provide for a dynamic mechanism that allows for the selection and prioritization of these potentially competing policies.

C.2. Policy Types

FIGS. 2A, 2B, and 2C illustrate example policy lists according to one implementation. For ease of illustration, FIGS. 2A-2C show three policy lists. In one implementation, policy lists may be stored in policy tables as shown. In particular implementations, ACL and QoS policies may be compiled into the look up tables, and these policies may factor in that one client may have a different prioritization of the same policies than other clients, as indicated by the indirection table. In particular implementations, there may be 1-N policy lists. In one implementation, each policy list may be specific to a key type or category of policies such as those described above. For example, policy list 1 of FIG. 2A may be associated with client-based policies, policy list 2 of FIG. 2B may be associated with VLAN or group-based policies, policy list 3 of FIG. 2C may be associated with network-based policies, etc. In one implementation, each key type corresponds to a tuple of attribute types. For example, policy list 1 of FIG. 2A may be specific to client-based policies, and each entry may contain an attribute tuple including a client MAC address, a protocol identifier, etc., or combination thereof. Similarly, in one implementation, policy list 2 of FIG. 2B may be specific to VLAN or group-based policies, and each entry may contain an attribute tuple including a VLAN ID, a protocol identifier, etc., or combination thereof. Similarly, in one implementation, policy list 3 of FIG. 2C may be specific to network-based policies, and each entry may contain an attribute tuple including a client Network ID, a protocol identifier, etc., or combination thereof.

In one implementation, each entry of a policy list includes one or more actions (e.g., accept, deny, etc.) indexed by keys (i.e., attribute tuple). In one implementation, in a given policy list, the list of policies may be ordered by priority. For ease of illustration, a few key and policy entries are shown. In a particular implementation, there may be up to thousands of entries. Example scenarios applying the policy lists of FIGS. 2A-2C are described below in connection with FIG. 3.

C.3. Indirection Table

FIG. 3 illustrates an example indirection table according to one implementation. As FIG. 3 shows, the indirection table includes an entry for each client, each entry also identifies one or more policy lists in order of priority.

In one embodiment, the policy lists are heterogeneous and independent lists instead of homogeneous. For example, homogeneous means the key of each list has the same fields, and the fields are maskable. All unique fields of keys in all lists are combined into a single list. Software and hardware merge programs have been developed to perform such merging of lists. In contrast to homogeneous methods, embodiments of the present invention uses the indirection table, instead, which allows several heterogeneous policy lists to exist. The indirection table provides a mechanism for decision hierarchy that manages the heterogeneous policy lists (e.g., policy lists 2 and 3). In addition, an entry in the indirection list may be chosen using either a client MAC, or IP address, or client ID, or Group ID. This enables merging of decisions from several heterogeneous policy lists based on identity (e.g., client/group, etc.).

In other implementations, entries in the indirection table may correspond to a plurality of wireless clients, such as a VLAN group. As described in connection FIGS. 4 and 5, a packet processor 106 of a given central controller 42 may utilize the indirection table to apply one or more policy lists to a given frame in the order, or according to a priority, identified in the indirection table. In particular implementations, the indirection table facilitates a flexible policy lookup mechanism that may be implemented in hardware, firmware and software. In one implementation, one or more packet attributes such as a client MAC address or other wireless client identifier, VLAN ID, protocol identifiers, etc., indexes into the indirection table. In the implementation described below, an entry in the indirection table includes an ordered set of policy lists or tables. The order of the policy lists indicates the prioritization of the policies corresponding to the policy lists. As described in more detail below, the ordering of policy lists for a given entry in the indirection table may be based on one or more prioritization policies. Still further, the policy lists themselves may contain an ordered list of policy entries defining another prioritization of policies within a given policy list.

In an example scenario, according to the indirection table of FIG. 3, a client identified with an address MAC 4 would be associated with policy list 2 and policy list 3, and in that order. In one implementation, a client may be identified by its MAC address, a client ID that was previously derived from its MAC address, IP address, or client ID derived from an IP address. Furthermore, in one embodiment, several clients may be grouped and a key may be used as a group tag assigned to a group of clients looking up a client MAC/IP address. A group of clients may map to the same Group ID based on network policies. An example group tag may be a security tag.

Now, referring to FIG. 2C, according to policy list 3, if the client is connected to network 7, the applicable policy would not permit the client to transmit and receive RTP traffic. However, if the client belongs to a VLAN group 1 where RTP traffic is allowed (FIG. 2B), the applicable policy may still permit the exchange of RTP traffic. In other words, there is a matching entry for VLAN 1 in policy list 2. As such, policy list 2 will take priority over policy list 3 with regard to this client and RTP traffic. However, with regard to RTP traffic from other clients on Network 7 (but not in the VLAN 1 group), policy list 2 will not be applied. Because these clients belong to network 7, policy list 3 will be applied to the client for RTP traffic. As such, all RTP traffic from these clients will be denied. Note that with regard to policy list 3, networks 2, 5, or 7 may have other significance. For example, a network may be identified by VLANs that in turn have a 1-to-1 correspondence with an IP Subnet. Alternatively, network 2, 5, or 7 may also be identified by other forms of group tags that are assigned based on security groups rather than simple VLANs.

In one implementation, all applicable policy lists (e.g., here, policy lists 3 and 1) may be consulted, but enforced according to the priorities of the indirection table. In some implementations, the results of a particular policy list may override other policy lists. For example, if a given policy list denies access to a particular client, other policy lists would no longer be relevant to that client. In other implementations, the packet processor 106 stops with the first lookup that yields a match.

In one implementation, the indirection table is implemented in hardware, where reserved memory storage space is allocated for each entry of the indirection table. For example, if a given value is entered, that value may be stored in a particular, dedicated storage space.

Figure 4:
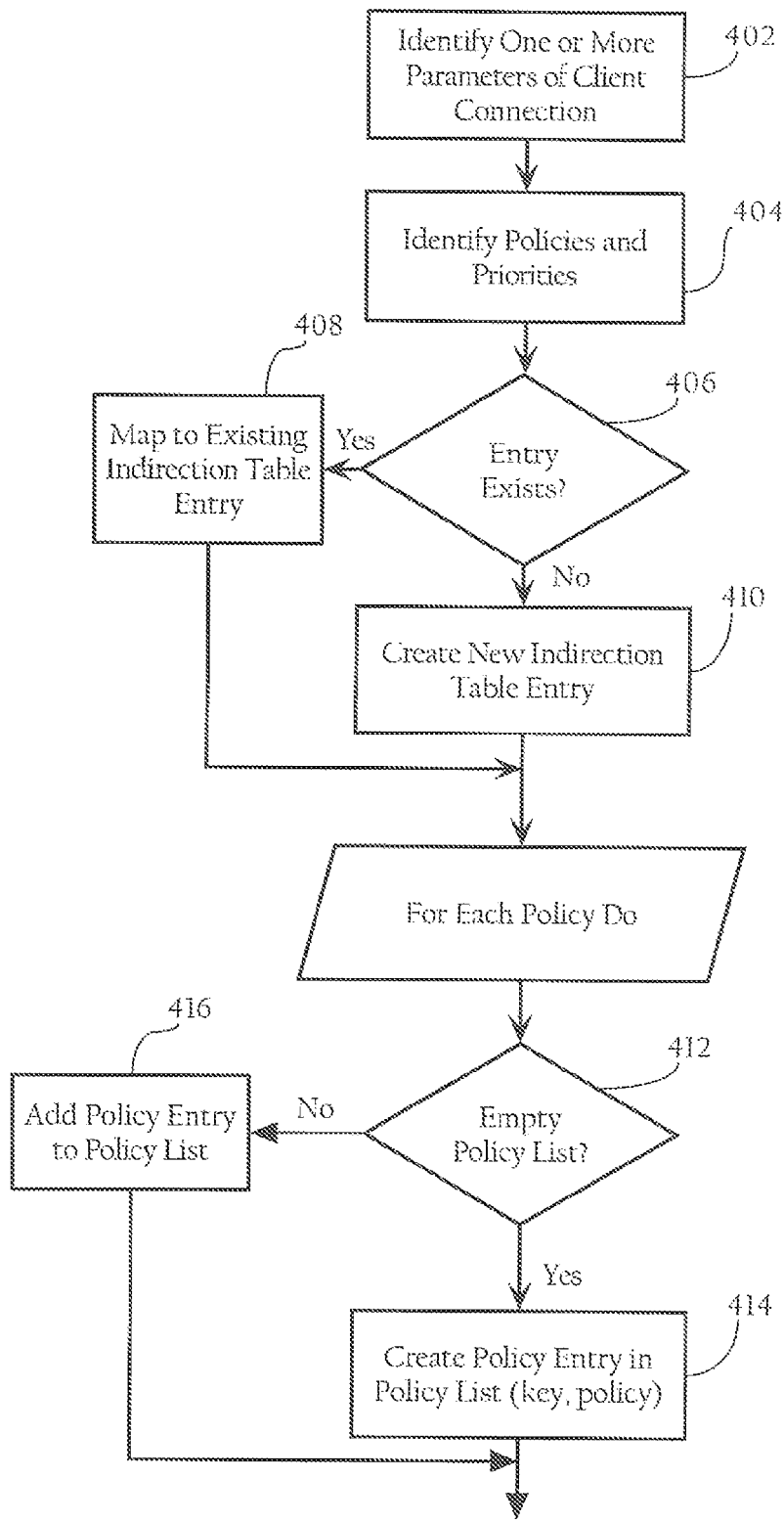
FIG. 4 illustrates an example process for generating an indirection table and policy lists according to one implementation.

FIG. 4 illustrates an example control plane process for generating an indirection table and policy lists according to one implementation. The indirection and policy tables can be used by the data plane to apply one or more policies according to the prioritization defined in the indirection table. As a client connects to a network (for example, during association, re-association and/or authentication processes, the central controller 42 identifies one or more parameters of the client connection (402). In one implementation, the central controller 42 can determine various attributes of the connection, such as MAC address, VLAN identifier, 0.1× certificates, the WLAN from which a client has roamed, as well as AAA-override policies specific to the client. As described in more detail below, all of these attributes, as well as the WLAN (and access point) to which the client is associated and default network policies, can then be used to determine the one or more policies (policy set) applied to the client. In particular implementations, establishment of the connection may involve an original association/authentication or a re-association if the client is roaming. The central controller 42 then identifies policies based on the identified parameters and prioritizes the policies according to another policy (404). In one implementation, the ordering process may be based on a prioritization policy configured by a network administrator. For example, in one embodiment, a prioritization policy may define a prioritization of home network policies over foreign network policies. In one embodiment, a prioritization policy may define a prioritization of group-based policies over network-based policies.

As described above in connection with FIG. 3, in particular implementations, each entry identifies one or more policy lists, where the ordering of policy lists indicates a prioritization for the policies. In particular implementations, indirection table entries may be shared by multiple clients. As such, the central controller 42 may determine if an indirection table entry for identified policies and priorities already exists (406). If an entry that maps to the connection parameters exists, the central controller 42 maps the connection to the existing entry (408). If an entry for the connection does not exist, the central controller 42 creates a new entry for that connection (410). While FIG. 4 describes a case where indirection table entries are shared, the indirection table may also be applied to cases where table entries are not shared. In the non-shared case (typically, where the indirection table is indexed, by client MAC address), the central controller 42 simply identifies parameters, identifies policies and priorities, and creates an indirection table entry.

For each determined policy, the central controller 42 determines whether the policy list supporting the key appropriate to the respective policy is empty (412). If so, the central controller 42 creates a policy entry in the policy list (414). Otherwise, the central controller 42 populates a policy list with existing entries with the new policy, potentially rearranging the ordering of the policies within that policy list. Each policy list, as discussed above is differentiated by a key type including a tuple of attribute types. For some policy lists, the key for the entry is based on the client information (e.g., MAC address, etc.), and the key indexes one or more actions (such as permit/deny, etc.). As described above in connection with FIGS. 2A-2C, different policies may be grouped in different policy lists depending on the tuple of attribute types that are used to create the key.

D. Application of the Indirection Table and Policy Lists

Figure 5:
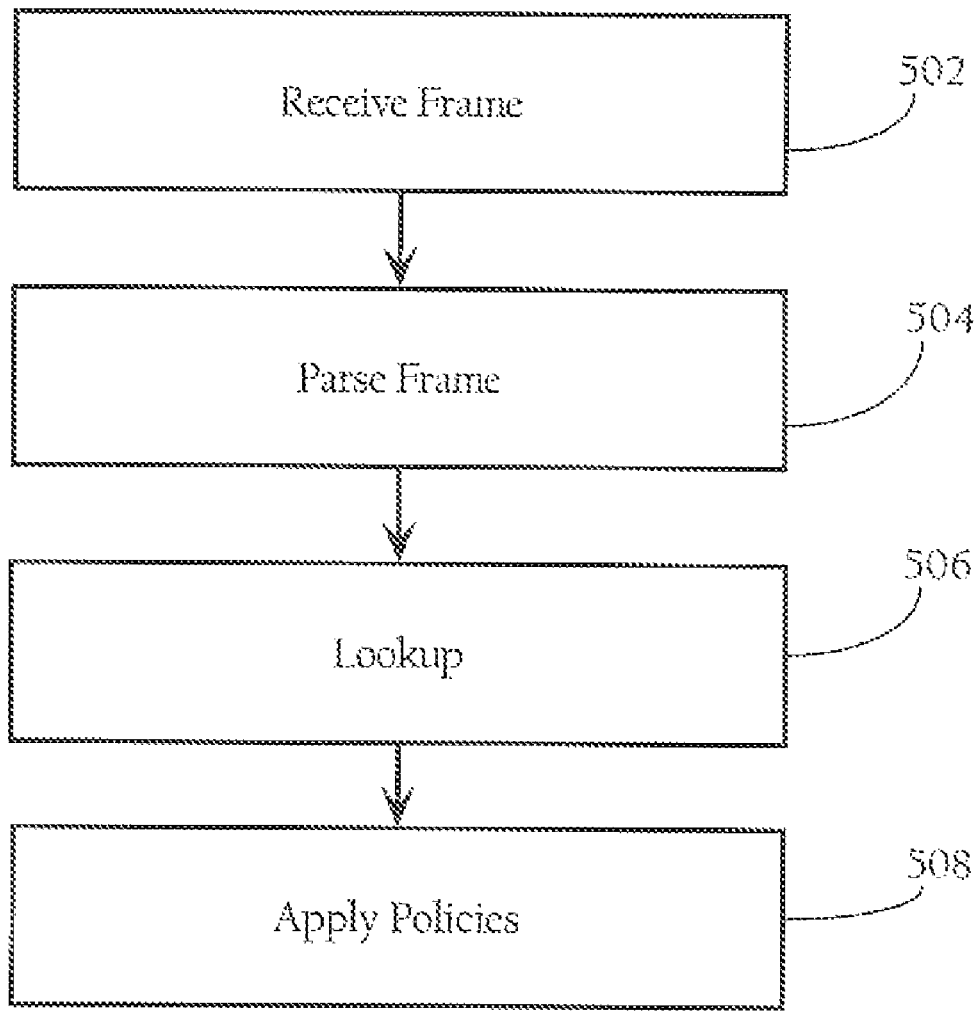
FIG. 5 illustrates an example process for applying the indirection table and policy lists to a particular client according to one implementation.

FIG. 5 illustrates an example data plane process for applying the indirection table and policy lists to a particular client according to one implementation. As FIG. 5 shows, the packet processor 106 receives (502) and parses a frame (504). In one implementation, a given frame may include different encapsulating headers (e.g., tunnel header, sub header/intermediate headers, client packet, etc.) and different data fields. The packet processor 106 extracts client information such as client MAC address, protocols, VLAN ID, Network ID, etc. The packet processor 106 then performs a lookup in the indirection table (506) to identify one or more policy tables. In one implementation, the packet processor 106 utilizes the client MAC address to look up the applicable policy lists and priorities in the indirection table. The packet processor 106 then performs a lookup in one or more of the policy lists identified in the indirection table entry corresponding to the frame. In particular implementations, the packet processor 106 may perform various types of lookups. For example, the packet processor 106 may perform an ACL lookup, a QoS lookup, etc. Other types of look ups are possible. The packet processor 106 then applies the policies in accordance with the prioritization indicated in the indirection table (508). As a result, the appropriate policies (e.g., network-based policies, VLAN or group-based policies, client-based policies) and appropriate prioritization are applied based on the particular client.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more tangible non-transitory media for execution and when executed operable to:
   identify one or more parameters of a connection with a client;
   determine one or more policies, and a prioritization order for the determined policies, based on the one or more parameters;
   access an indirection table to create an entry for the client, wherein the entry indicates the prioritization order of the determined policies; and
   create one or more entries in one or more policy data structures for the one or more determined policies.

2. The logic of claim 1 wherein the indirection table and the one or more policy data structures are accessible to a data plane for processing of received frames.

3. The logic of claim 1 wherein the logic is further operable to populate one or more policy lists with the one or more policies based on the one or more parameters.

4. The logic of claim 1 wherein the logic is further operable to:
   populate one or more policy lists with the one or more policies; and
   index the one or more policies by keys based on a tuple of attributes.

5. The logic of claim 1 wherein the one or more parameters comprises one or more of network information, group information, and client information.

6. The logic of claim 1 wherein the one or more policies comprise network-based policies, group-based policies, and client-based policies.

7. The logic of claim 6 wherein the network-based policies comprise wired network and wireless network policies.

8. The logic of claim 1 wherein at least one of the one or more policies follows the client from one network to another network.

9. A method comprising:
   determining, by one or more computing devices, one or more policies, and a prioritization order for the determined policies, based on the one or more parameters;
   accessing, by the one or more computing devices, an indirection table to create an entry for the client, wherein the entry indicates the prioritization order of the determined policies; and
   creating, by the one or more computing devices, one or more entries in one or more policy data structures for the one or more determined policies.

10. The method of claim 9 further comprising populating, by the one or more computing devices, one or more policy lists with the one or more policies based on the one or more parameters.

11. The method of claim 9 further comprising:
    populating, by the one or more computing devices, one or more policy lists with the one or more policies; and
    indexing, by the one or more computing devices, the one or more policies by keys based on a tuple of attributes.

12. The method of claim 9 wherein the one or more parameters comprises one or more of network information, group information, and client information.

13. The method of claim 9 wherein the one or more policies comprise network-based policies, group-based policies, and client-based policies.

14. The method of claim 9 wherein at least one of the one or more policies follows the client from one network to another network.

15. An apparatus comprising:
a network interface; and
one or more packet processors comprising control plane logic operable to:
identify one or more parameters of a connection with a client;
determine one or more policies, and a prioritization order for the determined policies, based on the one or more parameters;
access an indirection table to create an entry for the client, wherein the entry indicates the prioritization order of the determined policies;
create one or more entries in one or more policy data structures for the one or more determined policies;
wherein the one or more packet processors further comprise data plane logic operable to:
access the indirection table against one or more attributes of a received frame to identify one or more policies for the frame; and
apply the one or more policies based on the prioritization indicated in the indirection table.

16. The controller of claim 15 wherein the instructions are further operable to cause the one or more processors and the controller to populate one or more policy lists with the one or more policies based on the one or more parameters.

17. The controller of claim 15 wherein the instructions are further operable to cause the one or more processors and the controller to:
populate one or more policy lists with the one or more policies; and
index the one or more policies by keys based on a tuple of attributes.

18. The controller of claim 15 wherein the one or more parameters comprises one or more of network information, group information, and client information.

19. The controller of claim 15 wherein the one or more policies comprise network-based policies, group-based policies, and client-based policies.

20. The controller of claim 15 wherein at least one of the one or more policies follows the client from one network to another network.

\* \* \* \* \*